Dec. 27, 1949     A. H. DALL     2,492,688
HYDRAULIC POWER UNIT
Filed June 11, 1946     3 Sheets-Sheet 1

INVENTOR.
Albert H. Dall
BY
H. K. Parsons & L. W. Wright.

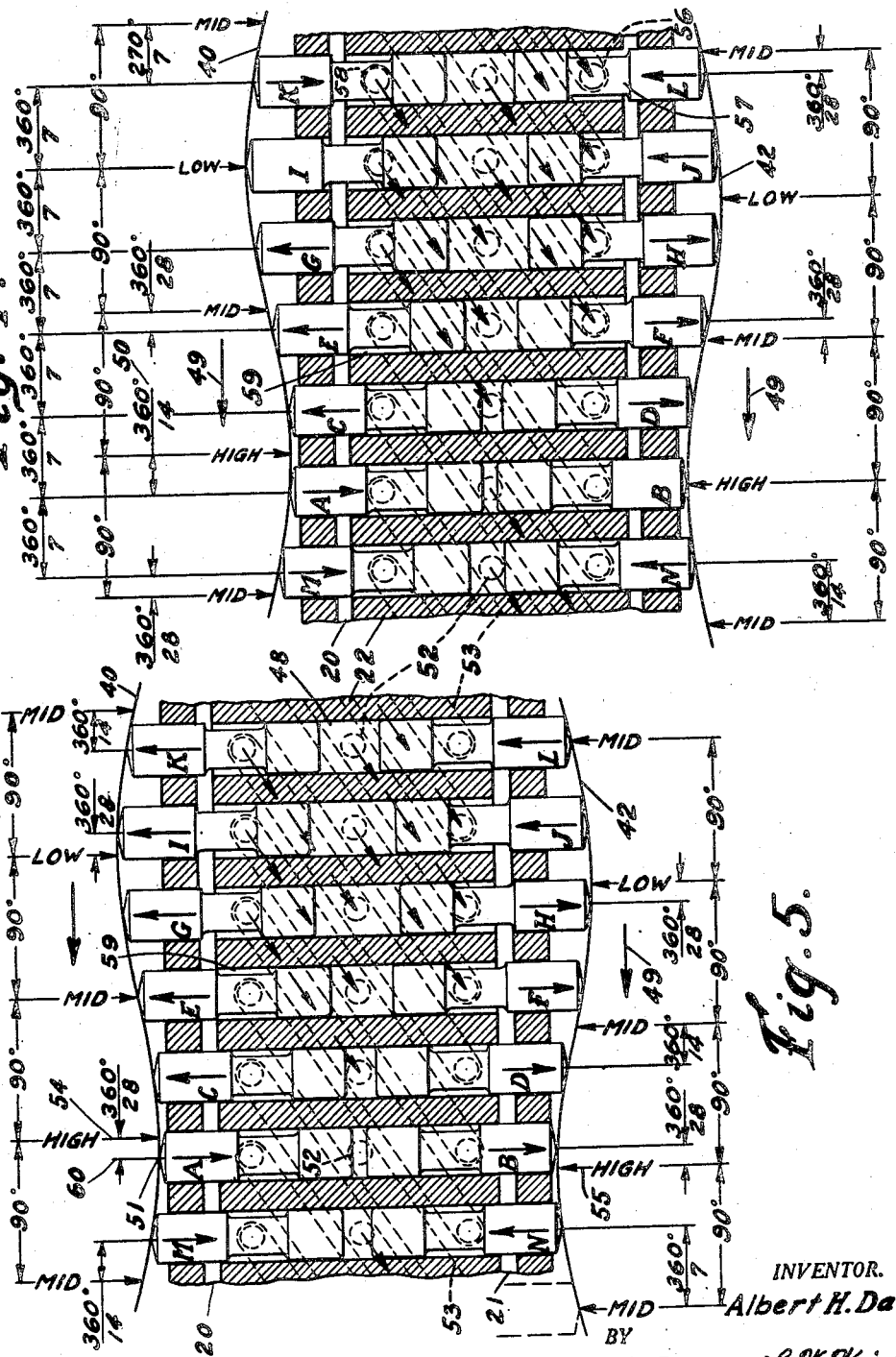

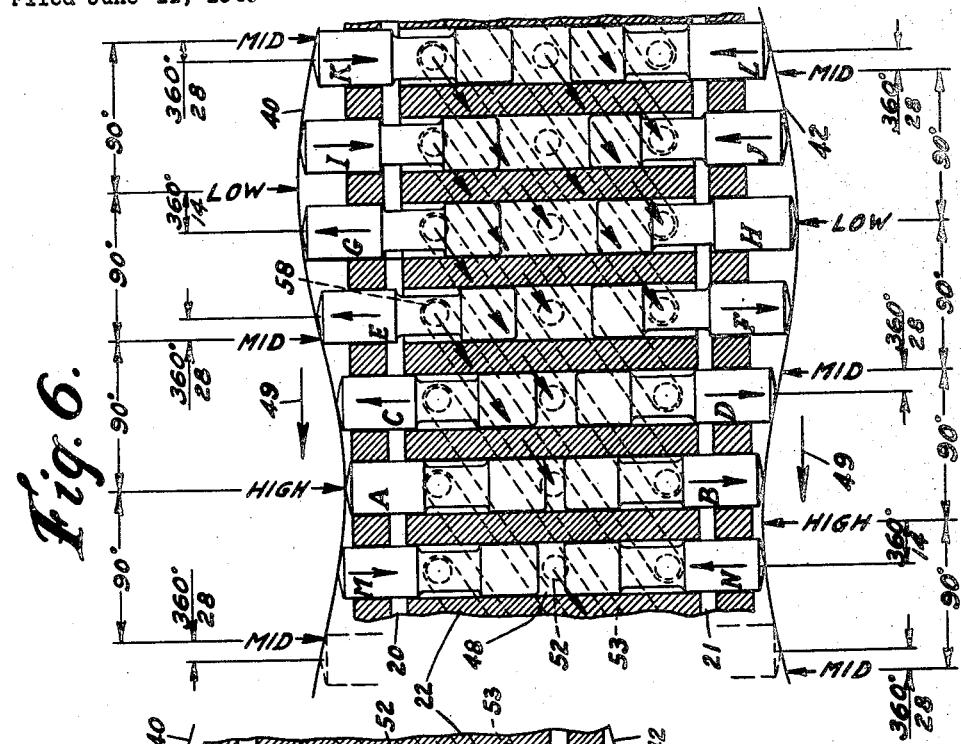
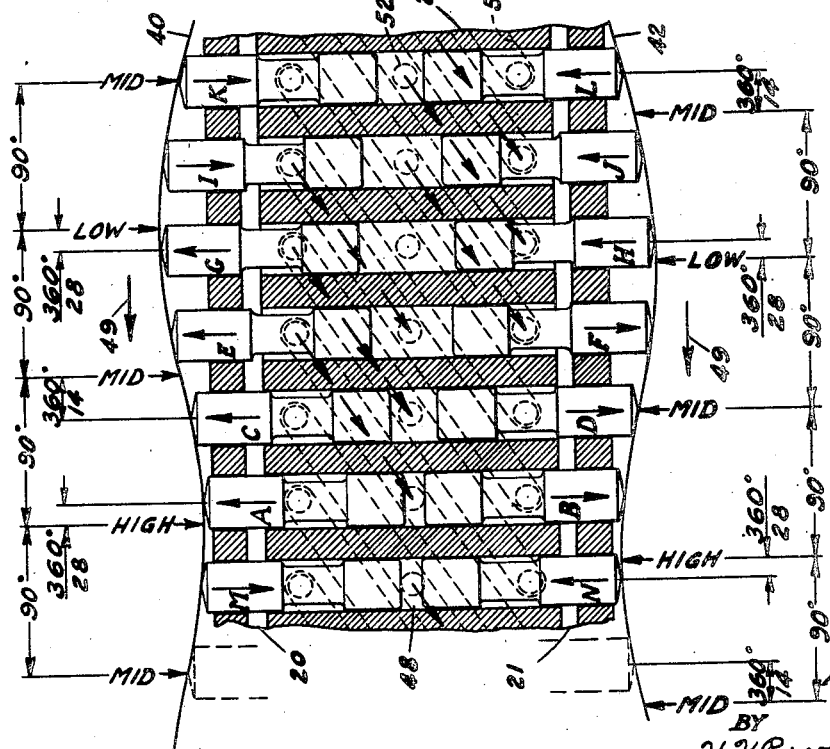

Patented Dec. 27, 1949

2,492,688

UNITED STATES PATENT OFFICE 2,492,688

HYDRAULIC POWER UNIT

Albert E. Dall, Cincinnati, Ohio, assignor to The Cincinnati Milling Machine Co., Cincinnati, Ohio, a corporation of Ohio Application June 11, 1946, Serial No. 675,929

7 Claims. (Cl. 103—166)

This invention relates to improvements in hydraulic power units.

One of the objects of the present invention is the provision of an improved hydraulic power unit alternatively employable either as a pump, a motor, or a metering member.

A further object of the invention is the provision of a highly efficient hydraulic power unit for effecting smooth and substantially uniform non-pulsating operation.

Additional objects of the present invention include the provision of a hydraulic power unit in which smooth operation at all speeds may be obtained through the use of an odd number of cylinders, which will have a high effective starting torque in the absence of internal preload or alternatively if a large internal preload exists, occasioned, for example, by a high back pressure, which will have high efficiency throughout the entire speed range and particularly at low speeds with large preload; and in which, despite the employment of an odd number of cylinders, it is possible to attain perfect piston valving.

A further object of the invention is the provision of a structure embodying a minimum number of either rotating or reciprocating elements and in which certain of said elements are so adapted and arranged as to perform dual functions whereby a tendency to development of vibration is minimized and the efficiency and useful life of the structure greatly prolonged.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 1:
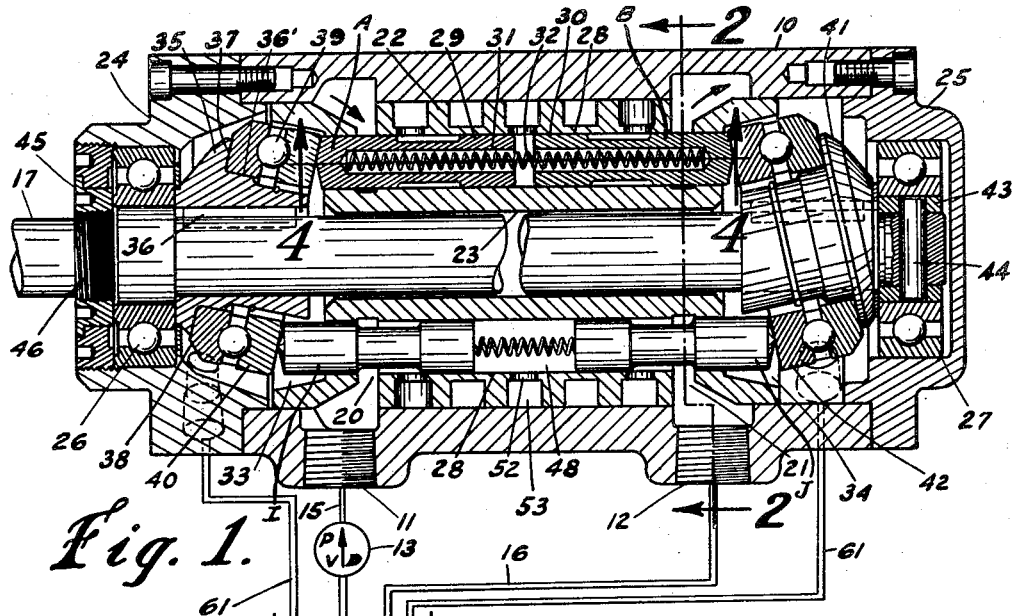
Figure 1 represents a longitudinal section through a unit constructed in accordance with and embodying the principles of the present invention.

Figures 4, 5, 6, and 7 are expanded diagrammatic views as on section 4—4 of the stator illustrating the relative position of the parts during different portions of an operating cycle.

In the drawings in which similar reference characters are employed to indicate corresponding parts through the several views, the numeral 10 designates the main cylindrical casing of the unit provided with an intake port as at 11 and an outlet as at 12. Suitable hydraulic connections may be established with these ports. In the event that the unit is to be employed as a motor, a variable delivery or other pump as diagrammatically illustrated at 13 may be employed to force an impelling fluid as from reservoir 14 through conduit 15 into the intake, while the outlet 12 is connected to reservoir as by the exhaust conduit 16. It will, of course, be understood that in the event the member is employed as a pump an actuating power would be applied to, in place of derived from, the shaft 17 in which event 15 would serve as a suction in place of pressure input line and the line 16 would then become a high pressure conduit.

Figure 3:
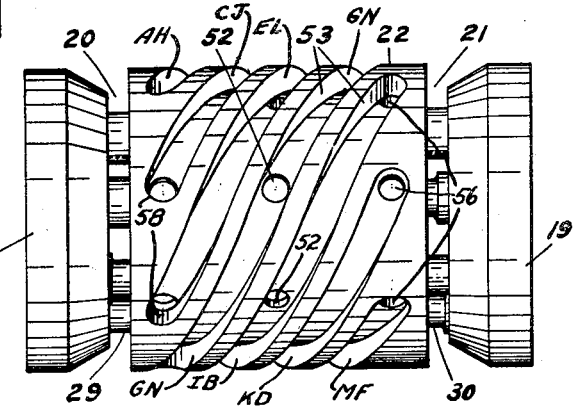
Figure 3 is an elevation of the stator unit.

The stator unit or cylinder block is shown in elevation in Figure 3. It has the terminal cylindrical portions 18 and 19 interfitting with the casing and provided with the peripheral intake groove 20 and output groove 21. Intermediate these grooves is the cylindrical body portion 22 mounted in close interfitting relation with the interior of the casing 10 and having formed in its outer face a multiplicity of spaced helical grooves peripherally closed by the circumscribing wall of the casing as will be best understood by reference to Figure 1. The stator is formed with a central bore 23 loosely receiving the shaft 17 which extends therethrough and is rotatably mounted in the end plates 24 and 25 of the casing as by the anti-friction bearings 26 and 27.

Formed in the stator in concentric circumscribing relation to the bore 23 are a plurality of transverse cylindrical passages or piston chambers 28 which in the present instance have been indicated as seven in number. It will be understood, however, that there may be either an odd or even number, depending on the particular use for which the unit is intended without in any way departing from the principles or structural features of the present invention. Mounted in each of the piston chambers 28 is a pair of piston elements generically designated by the numerals 29 and 30 having the centrally counterbored passages as at 31 to receive the interposed expander spring 32 tending to separate the members 29 and 30 and urge them outwardly as respects the stator unit into the counterbore spaces 33 and 34 interiorly formed in the cylindrical terminal portions 18 and 19 of the stator element.

In the embodiment chosen for purposes of illustration, the unit has been shown as of the constant displacement type. Mounted on the left hand portion of shaft 17 as shown in Figure 1 is the collar 35 keyed to the shaft as at 36 for rotation therewith and provided with a cylindrical seat as at 36' and backing flange portion at 37 disposed at a definite angle to the axis of rotation of shaft 17. These elements support ring 38 forming a race for the anti-friction members 39 which, in turn, support the cam or swash plate 40 for free rotation relative to the shaft and associate elements but with its inner face maintained at a definite angular relation to the axis of rotation of said shaft. A corresponding series of elements designated as an entirety by the numeral 41 having an opposite angular relationship to that of the parts just described is secured on the opposite end of shaft 17. The particular phase relationship of these parts and the reasons therefor will be hereinafter described in connection with the diagrammatic views.

It will be noted that the outer ends of the several piston elements 30 are urged by springs 32 into engagement with the faces of the cam plates 40 and 42. Collar 43 pinned as at 44 to shaft 17 provides a solid abutment limiting outward axial movement of the unit 41 while collar 45 threaded as at 46 on shaft 17 reacts against the inner race 47 of the anti-friction bearing 26 to hold member 35 inward on the shaft. As a result of this construction any pressure reaction of the piston elements against the plate units confines the end thrust reactions solely to the included portion of shaft 17 so that there is no power end thrust reaction of the shaft as respects the supporting casing of the unit during operation.

The manner of operation and certain of the improved features of the present invention would be best understood by reference to the expanded diagrammatic views, Figures 4 to 7 inclusive. From these it will be noted that two swash plates—40 and 42—are employed which engage two sets of independent pistons. These two sets or banks of pistons have common cylinder holes so that the space between the backs of a pair of pistons in the same cylinder hole constitutes the area which contracts and expands or the pumping space which generically has been indicated by the reference character 48. The variable volume of this space is determined by the reaction of the cam 40 on the bank or series of piston elements associated therewith in conjunction with the reaction of the cam 42 on its associated pistons. It will be evident that the nature of reaction of each of these angularly disposed cams or swash plates during a complete relative rotation of the plate and an individual piston is in the nature of a sine curve and the effective faces of the members 40 and 42 have been accordingly so illustrated in the diagrammatic views. In these views the unit has been considered operating as a motor in a clockwise direction as viewed from the right hand end of Figure 1 with the result that the swash plates are moving relative to the pistons in the direction indicated by te arrows 49 and since the plates are both keyed or secured to the shaft 17 they will have an equal and uniform effective rate of rotation or reaction against the respective piston elements. In the particular form chosen for purposes of illustration there have been indicated seven sets of equally spaced piston elements, the center line spacing between adjacent pairs of piston elements being therefor angularly identifiable as $$\frac{360°}{7}$$

In the employment of piston valving it has hitherto been deemed necessary for proper valve timing to have the number of pistons divisible by four in order to have a piston at midstroke valving a piston at maximum or minimum stroke, ordinarily an impossibility with an odd number of sets of pistons as here illustrated. The present invention, however, makes it possible to utilize piston valving with an odd number of pistons and overcomes the apparent insurmountable difficulty. This has been effected as indicated in the drawings by staggering or offsetting the high and low points of the respective cam reaction members 40 and 42. As indicated, the high points are shown displaced relative to each other a distance equal to one-half the center to center distance of the cylinders, or $$\frac{360°}{14}$$

as indicated at 50. When the swash plates are so arranged, the pistons will be closest together when they contact at points on the swash plates midway between the two displaced high points as, for example, at point 51 in Figure 5. Any relative movement of the pistons and controlling end plates in either direction will result in a separation of the pistons or increase in the volume of the compression chamber or intervening space 48. This, therefore, represents the crossover point from pressure to exhaust, and for operative functioning it is necessary that some valve mechanism be so associated with these pistons that the space between the pistons formerly coupled to exhaust or overflow be now coupled to intake.

To admit flow into and out of space 48 intervening each pair of pistons there has been provided the aperture or port 52 affording communication with the helical groove 53 individual to that particular cylinder or compression chamber. To facilitate a comparison of the relative positions assumed by the particular pairs of piston valve elements in the several figures, these elements have been designated therein by reference letters. A and B designate the pair of piston elements which in Figure 5 are shown contacting the element 40 just in advance of the high point 54 thereof and just past high point 55 of element 42. The previous position occupied by these parts has been indicated in Figure 4 from which it will be noted that the associated helical conduit extending from E to L whose central port 52 communicates with the cylinder of pistons A—B in extension toward the left terminates in a terminal aperture or port 56 communicating with the outer portion of the cylinder containing the pistons K and L. As there shown, piston L was approaching midpoint on 42 but was still sufficiently displaced therefrom that the groove 57 therein operated as a piston valve coupling port 56 by way of the groove with the peripheral outlet channel or groove 21 of the stator. However, as the parts reach the relative positions shown in Figure 5, piston L being disposed at midpoint has just closed off the outlet or discharge from the space between the inner ends of A and B.

In its right hand extension from the said port 52, groove 53 terminates in the port 58 adjacent groove 59 in piston E, but as shown in Figure 4 while E is moving outwardly the groove 59 thereof lies within the cylinder chamber and egress of fluid from groove 20 by way of the piston groove and aperture 59 is prevented. As the pistons AB reach the effective point 60 of minimum volume of the compression chamber or space, piston E is on the midpoint of the receding surface of 40. As by rotation of the swash plates high point of 40 comes into alignment with A, E has shifted outwardly coupling 20 with 53 by way of 58 and actuating pressure is flowing into the chamber space intermediate A and B, causing outward reaction of these against 40—42 effecting rotative movement of the parts and shaft 17 in the direction indicated by the arrow 49. This action continues until by rotation of 40 the ascending curve arrives with its midpoint opposite the member E when the position of E will correspond with that of K, Figure 7, again shutting off flow from 20 through 53 to a space 52 intervening pistons A and B. At this moment the pistons A and B will occupy the same relative positions as do G and H in Figure 7, having then arrived at their point of maximum separation as determined by the out-of-phase relationship of 40 and 42. Continued advance of the surfaces 40 and 42 will put the members A and B in the relative positions of I and J, Figure 5, or reacted upon by the approaching curves of 40 and 42, while at the same time piston L will be riding on the receding curve of 42 or in the same relative position as that occupied by piston F in Figure 5 so that the chamber space between A and B will have been reconnected to outlet conduit 21 by way of the valving groove in the outer portion of L. It will be evident from a comparison of the drawings Figures 4 to 7 inclusive that the actual relative movement of parts which has taken place between the showing in Figure 4 and that in Figure 7 represents a movement of only a portion of a single cycle equalling $$\frac{1080°}{28}$$

or approximately 38.5 degrees. It is believed, however, that this adequately represents and indicates the consecutively effected relative movements of the several pairs of piston elements with respect to the stator as effected by rotation of the swash plate elements so that both the construction and detailed operation of my invention may be readily understood from a consideration of these views in connection with the preceding specific description.

It will be further noted that in these figures certain portions on the curvature of the respective bounding lines representing the effective positions of the end abutments or swash plates have been designated by the terminology "High" "Mid" and "Low." As respects each of these designations, in each of the figures the point designated by arrow and the word High indicates a maximum inward position of the abutment surface effecting maximum inward movement of the controlled piston as, for example, the piston B in Figure 4 or the piston A in Figure 6. Similarly, the designation "Low" and its accompanying arrow indicates the maximum outward position of the effective swash plate abutment surface as reacting on the pistons, permitting their maximum outward movement, as indicated for example in connection with piston I, Figure 4, or H, Figure 6. The designation "Mid" and arrow, as indicated on all the drawings, represents the point intermediate or 90 degrees from both the high point and low point, these existing at two 180 degree spaced or diametrically opposite positions.

Figure 2:
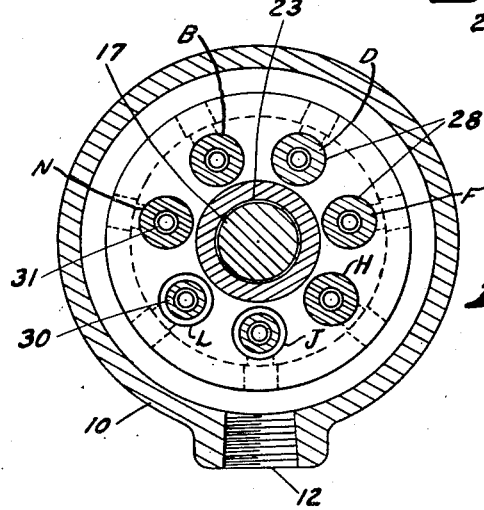
Figure 2 represents a transverse sectional view as on the line 2—2 of Figure 1.

It will be understood that a similar operation is effective successively as respects each pair of opposed piston elements for controlling introduction and exhaust of fluid into their intervening individual compression chamber in that in each instance an individually controlled anticipating piston valve member permits the properly timed admission of fluid into the compression chamber while a following individually controlled piston element alternatively controls the exhaust. It will be noted that there is a single groove individual to each cylinder port formed in the exterior periphery of the stator element and that the flow through this groove whether into or from the piston chamber is always unidirectional, eliminating any necessity for crossover or alternative couplings to input and discharge ports. As a result, it is possible to form the entire set of fluid transmitting passages as grooves in the exterior of the stator and to then mount the same in the casing which forms a closure for the conduits thus provided, while no additional parts other than the operating pistons themselves are required for the combined power production and inlet and outlet valving controls for the several pressure cylinders. By reference to Figures 4 to 7 of the drawings it will be noted that the pistons are arranged in pairs with the piston elements A, C, E, G, I, K, and M at the left side of the unit as viewed in Figure 1 and with the pistons B, D, F, H, J, L, and N at the right side. Figure 2 has been shown as a section through the right hand portion of the unit as viewed in Figure 1. The latter series of pistons only appear in this figure and have been so designated on Figure 2.

It will further be noted by reference to Figures 4 to 7 inclusive that the diagonally extending grooves on the periphery of the stator correspond in number to the number of piston groupings, such as A—B, C—D. Depending on the valve porting positions, these grooves each serve successively as inlet and outlet grooves but with unidirectional flow effect in the grooves. The piston connection of the grooves, as will be evident from Figures 4 to 7, is as follows: A to H, C to J, E to L, G to N, I to B, K to D, and M to F. It is to be understood that these grooves are identical in form, but for convenience of identification of relative position in accordance with the piston locations as structurally shown in Figures 1 and 2 and as diagrammatically illustrated in Figures 4 to 7, they have been identified respectively by the reference letters AH. CJ. EL. GN. IB. KD. and MF in Figure 3. While the invention has been illustrated and described in connection with a unit having seven pairs of piston plungers, it will be understood that the same principles may be utilized in connection with varying numbers of cylinders, the essential being that the individual pistons selected for control purposes must for most efficient operation be at their midpoints when the controlled pair of pistons is at its maximum inward and its maximum outward relative positions so that the changeover in flow to or from the controlled pressure chamber will be properly effected. This means that the control pistons should be as nearly as possible angularly spaced 90 degrees plus or minus with respect to the controlled piston element. If $n$ equals the total number of cylinders and A the whole number nearest to $n/4$, A will represent the angular distance between the porting pistons and the cylinders being ported, while the general angular relation of the parts when $n/4$ is less than the whole number is represented by the formula:

$$A\left(\frac{360}{n}\right) - \frac{1}{4}\left(\frac{360}{n}\right) = 90°$$

or if $n/4$ is greater than the whole number by the formula:

$$A\left(\frac{360}{n}\right)+\frac{1}{4}\left(\frac{360}{n}\right)=90°$$

In other words, in the case of the particular form here illustrated in which the total number of cylinders is seven, it will be evident A, the nearest whole number to $n/4$ will be 2, although the actual result of this division, 1¾, is less than the whole number represented by A. Substituting the numeral 2 for A and 7 for $n$ in the first formula above given:

$$2\left(\frac{360°}{7}\right)-\frac{1}{4}\frac{360°}{7}=90°$$

$$2(51.429°)=102.858°$$

$$-\frac{1}{4}(51.42°)=\frac{12.855°}{90°}$$

On the other hand, if the $n$, the total number of cylinders, is 9, then A will still equal 2, but the actual result of $n/4$ or 9/4 will be 2¼, in which instance the second formula, that is, where $n/4$ is greater than the whole number will apply, here substituting:

$$2\left(\frac{360°}{9}\right) \text{ plus } \frac{1}{4}\left(\frac{360°}{7}\right)=90°$$

$$2(40°)=80°$$

$$+\frac{1}{4}(40°)=\frac{10°}{90°}$$

The high efficiency and high starting torque with or without internal preload is realizable because the high speed members, such as the shaft and associate swash plate elements, are supported on anti-friction bearings while the hydraulic joints are on the pistons only. Inasmuch as the pistons themselves are relatively slow-moving elements their wear is negligible particularly since with the inner and outer hydraulic fluid couplings they are ideally lubricated, the piston porting results in but small viscous drag and the structure therefor lends itself to efficient high speed operation. It will further be evident that if the actuating medium is introduced under pressure at the left hand side of the pump as viewed in Figure 1 the same will rotate, as described, in a clockwise direction whereas if it is forced into the right hand side the structure will operate in a reverse or counterclockwise direction with output of power from shaft 17. Alternatively, if the shaft 17 is positively operated in one direction or the other the device will function as a pump instead of a motor, while if indicating mechanism is coupled with the shaft 17 the unit may be employed for fluid metering purposes without development of appreciable internal pressure.

To prevent building up of high internal pressure through leakages, suitable drains to reservoir, such as 61, may be provided at the ends of the casing, as indicated in Figure 1.

What is claimed is:

1. A hydraulic unit including a stator having a plurality of annularly arranged cylinders therein, piston units mounted in pairs in said cylinders, means for urging the pistons of a pair apart to create a space therebetween, a rotary element mounted concentric with the cylinders and having a pair of angularly disposed cam elements jointly engaging the piston elements, said cam elements being disposed in out-of-phase relationship to each other whereby non-synchronous approach and retraction of each pair of pistons with respect to each other is effected upon relative rotation of the pistons and cam elements, portings for the respective spaces intervening each pair of opposed piston elements, valving means on each piston element, and conduits connecting respective valving means with portings of remote cylinders for determining the intake and exhaust of fluid as respects the controlled remote cylinder.

2. A stator element for a hydraulic unit comprising a substantially cylindrical body member having an uneven number of transverse cylinders formed therein and arranged in a circular series, said member having a plurality of helical grooves formed in the periphery thereof corresponding in number to the number of said cylinders and each extending substantially 180 degrees circumferentially of the stator, the said unit having ports formed therein centrally and terminally of each of said grooves interconnecting the same with underlying cylinders.

3. A hydraulic unit of the character described, including a stator unit and a casing enclosing said unit, said stator unit having a circular series of cylinders formed therein, one of said two first-named parts having a plurality of helically arranged conduit grooves formed therein corresponding in number to the number of cylinders and extending in a peripheral direction diagonally with respect to said cylinders, the stator having ports formed therein providing communication between the central portion of individual cylinders and individual grooves and having additional ports formed therein affording communication between terminal portions of the grooves and cylinders remote from the centrally ported cylinder, a pair of opposed piston members mounted in each cylinder, means for urging the pairs outwardly in the cylinders, out-of-phase oppositely angled abutment members jointly engaging the terminii of the several pistons for determination of their relative movements within the cylinders, each of said piston elements having an outer valve groove positioned to substantially underlie a terminal porting communicating with its cylinder, and conduit portions terminally circumscribing the cylinder bearing portion of the stator for selective coupling with the cylinder portings by way of the valve grooves during selected positionings of the respective pistons as determined by the abutment members, said abutment members being mounted for joint rotative movement whereby corresponding movements are successively imparted to the pairs of pistons.

4. A hydraulic unit of the character described, including a stator unit and a casing enclosing said unit, said stator unit having a circular series of cylinders formed therein, one of said two first-named parts having a plurality of helically arranged conduit grooves formed therein corresponding in number to the number of cylinders and extending in a peripheral direction diagonally with respect to said cylinders, the stator having ports formed therein providing communication between the central portion of individual cylinders and individual grooves and having additional ports formed therein affording communication between terminal portions of the grooves and cylinders remote from the centrally ported cylinder, a pair of opposed piston members mounted in each cylinder, means for urging the pairs outwardly in the cylinders, out-of-phase oppositely angled abutment members jointly engaging the terminii of the several pistons for determination of their relative movements within the cylinders, each of said piston elements having an outer valve groove positioned to substantially underlie a terminal porting communicating with its cylinder, and conduit portions terminally circumscribing the cylinder bearing portion of the stator for selective coupling with the cylinder portings by way of the valve grooves during selected positionings of the respective pistons as determined by the abutment members, said abutment members being mounted for joint rotative movement whereby corresponding movements are successively imparted to the pairs of pistons, the out-of-phase relationship of said abutment members being one-half the angular center distance between adjacent cylinders, whereby a pair of control valve pistons coupled with the terminal ports of the grooves will be at mid-position when the pistons of the intermediate center ported cylinder are shifted by engagement with the cams with their inner terminii in proximate relation.

5. A hydraulic unit of the character described including a casing having a shaft journaled therein, a pair of swash plate members mounted on the shaft in oppositely angled relation thereto but angularly displaced in out-of-phase relationship one with the other, a cylinder block unit supported by the casing in circumscribing relation to the shaft, said block having a circular series of equally spaced cylinders formed therein and extending longitudinally with respect thereto, pairs of piston elements mounted in each of said cylinders, means for urging the elements of each pair outwardly with respect to each other and into engagement with the adjacent faces of the swash plate members, the angular out-of-phase relationship of the swash plate members being one-half the angle between centers of adjacent cylinders, conduits centrally connecting each of said cylinders with a terminal portion of a cylinder substantially 90 degrees remote therefrom in one direction, additional conduit means connecting the center of each cylinder with the opposite outer portion of a cylinder substantially 90 degrees remote therefrom in the opposite direction from the direction of extent of the first conduit, an intake chamber adjacent the cylinder block at one end thereof, and an output chamber adjacent the cylinder block at the opposite end thereof, each of said pistons having a communication groove formed therein in substantially underlying relation to the conduit coupling with the outer end of its cylinder and of extent to afford communication between said conduit and the adjacent inlet or outlet chamber when the piston is in extended position whereby said piston serves as a control valve for a compression chamber intermediate a pair of pistons in a remotely disposed cylinder, substantially as and for the purpose described.

6. A hydraulic unit including a cylinder block having a number of cylinders formed therein arranged in a circular series each extending the entire length of the block, two banks of independent pistons mounted respectively in opposite ends of the cylinders whereby each cylinder contains a piston of each bank and the space between the inner ends of the pistons provides a variable volume compression chamber, means for urging the pistons outwardly in their cylinders, an angled control cam member for each bank, means supporting the cams and cylinder block for relative bodily rotation, the cams being so related that when a pair of pistons in any cylinder are in their proximate positions a remote individual piston in one bank will be at its midpoint of inward movement and a remote individual piston in the other bank will be at its midpoint of outward movement, each piston having a valve portion, and conduits extending from the compression chamber intervening the inner terminii of each associate pair of pistons and the valve portions of the individual pistons aforesaid whereby the latter will control the flow into or out of said chamber by way of said conduits.

7. A hydraulic power unit comprising a casing having spaced intake and discharge chambers, a shaft journaled in the casing and extending longitudinally thereof, a stator mounted in the casing having formed therein a series of cylindrical chambers parallel with and in concentric circumscribing relation to the shaft, said cylinders terminally communicating with the chambers, similar pistons mounted in each end of each of the cylinders, each of said pistons having an inner portion in sliding interfitting engagement with the wall of its cylinder and an intermediate reduced portion providing a valving groove projectible on the outward stroke of the piston into communication with the proximate inlet or discharge chamber, means for urging the several pistons outwardly in their cylinders, spaced cam means carried by the shaft in position to engage the outer ends of the piston for variably determining the position of the pistons in the cylinders, each cylinder having a central port and additional ports near the ends in overlying relation to the grooved portions of the pistons, conduit means connecting the central port of each cylinder with a port near one end of a cylinder spaced substantially 90 degrees therefrom in a clockwise direction and with a port near the opposite end of another cylinder spaced substantially 90 degrees from said central port in a counterclockwise direction, whereby the outer portions of the pistons in the two latter cylinders will act as control valves for the flow into and out of the intermediate centrally ported cylinder, said cam means being mounted in oppositely angled relation and out-of-phase an angular amount one-half the angular spacing of the centerlines of adjacent cylinders whereby the controlling valve pistons will be on midpoints of their respective cams when the pistons of the controlled cylinder are at maximum separation or approach as determined by the aforesaid cams.

ALBERT H. DALL.

REFERENCES CITED

The following references are of record in the file of this patent:

UNITED STATES PATENTS

| Number | Name | Date |
|---|---|---|
| 1,418,672 | Pelterie | June 6, 1922 |
| 1,978,595 | Nothstine | Oct. 30, 1934 |
| 2,010,378 | Sassen | Aug. 6, 1935 |
| 1,397,594 | Buchman | Apr. 2, 1946 |